(12) United States Patent
Kim et al.

(10) Patent No.: US 6,678,457 B2
(45) Date of Patent: Jan. 13, 2004

(54) OPTICAL SPLITTER MODULE

(75) Inventors: Seong Gwon Kim, Seongnam-si (KR); Soon Nam Jun, San Leandro, CA (US); Jong Ha Moon, Gwangou (KR)

(73) Assignee: Unicom Technologies, Co., LTD, Gwangju (KR)

( * ) Notice: Subject to any disclaimer, the term of this patent is extended or adjusted under 35 U.S.C. 154(b) by 116 days.

(21) Appl. No.: 10/082,977

(22) Filed: Feb. 25, 2002

(65) Prior Publication Data

US 2003/0103730 A1 Jun. 5, 2003

(30) Foreign Application Priority Data

Dec. 1, 2001 (KR) .......................... 2001-75587

(51) Int. Cl.[7] .............................. G02B 6/00
(52) U.S. Cl. ........................ 385/135; 385/134
(58) Field of Search ................... 385/135, 134, 385/136–137, 139

(56) References Cited

U.S. PATENT DOCUMENTS 5,708,742 A * 1/1998 Beun et al. ................. 385/53
6,167,183 A * 12/2000 Swain ....................... 385/135
6,556,763 B1 * 4/2003 Puetz et al. ................. 385/135

* cited by examiner

*Primary Examiner*—David V. Bruce
*Assistant Examiner*—Krystyna Suchecki
(74) *Attorney, Agent, or Firm*—Baker Botts, LLP

(57) ABSTRACT

The present invention is an optical splitter module comprising couplers, which have one or more optical connectors attached thereto. The optical splitter module further comprises an adaptor holder for fixing a plurality of optical adaptors in a line and having a height the same as or smaller than that of the optical adaptor, a housing having means for fixing the couplers, and a cover adapted for preventing the coupler from being externally exposed. The height of the optical splitter module is the same as or smaller than the height of the optical adaptor mounted on the adaptor holder. The adaptor holder further comprises a wrinkled portion with a plurality of peaks and gullies alternatively formed in a longitudinal direction. The wrinkled portion has a plurality of adaptor insertion holes for receiving and supporting the optical adaptors. The front edge of the housing has a toothed portion, which corresponds to the peaks and gullies of the wrinkled portion of the adaptor holder. The front edge of the cover has a toothed portion, which corresponds to the peaks and gullies of the wrinkled portion of the adaptor holder.

11 Claims, 12 Drawing Sheets

OPTICAL SPLITTER MODULE

FIELD OF THE INVENTION

The present invention relates to an optical splitter module, more particularly, to an optical splitter module comprising couplers attached with optical connectors and an encasing means containing the couplers.

BACKGROUND OF THE INVENTION

Conventional optical splitter modules contain a plurality of optical fiber couplers in a case and allow selective use of optical signals having a wavelength of 1310 nm or 1550 nm. The optical splitter module allows simultaneous monitoring between a service provider and a subscriber by dividing a portion of the optical signals, thus enabling prompt restoration and easy maintenance and repair of telecommunication jamming.

Figure 1A:
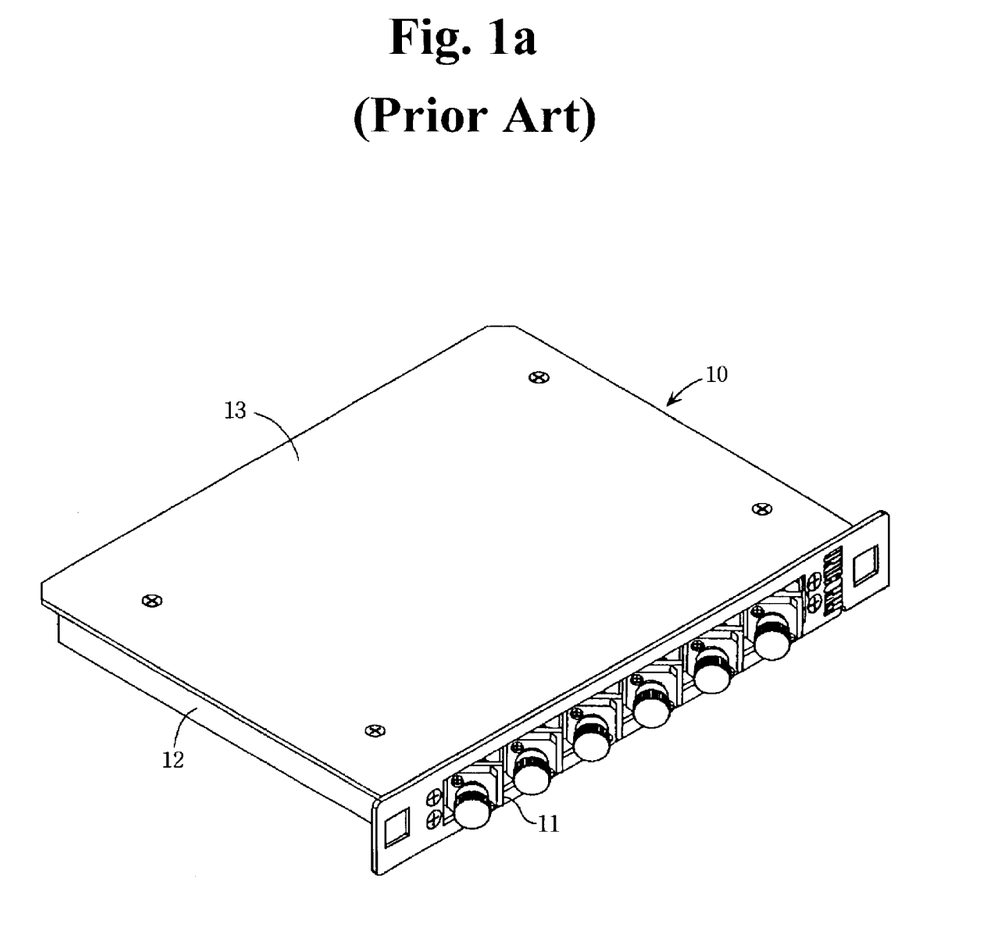
FIG. 1a is a perspective view of a conventional optical splitter module.
Figure 1B:
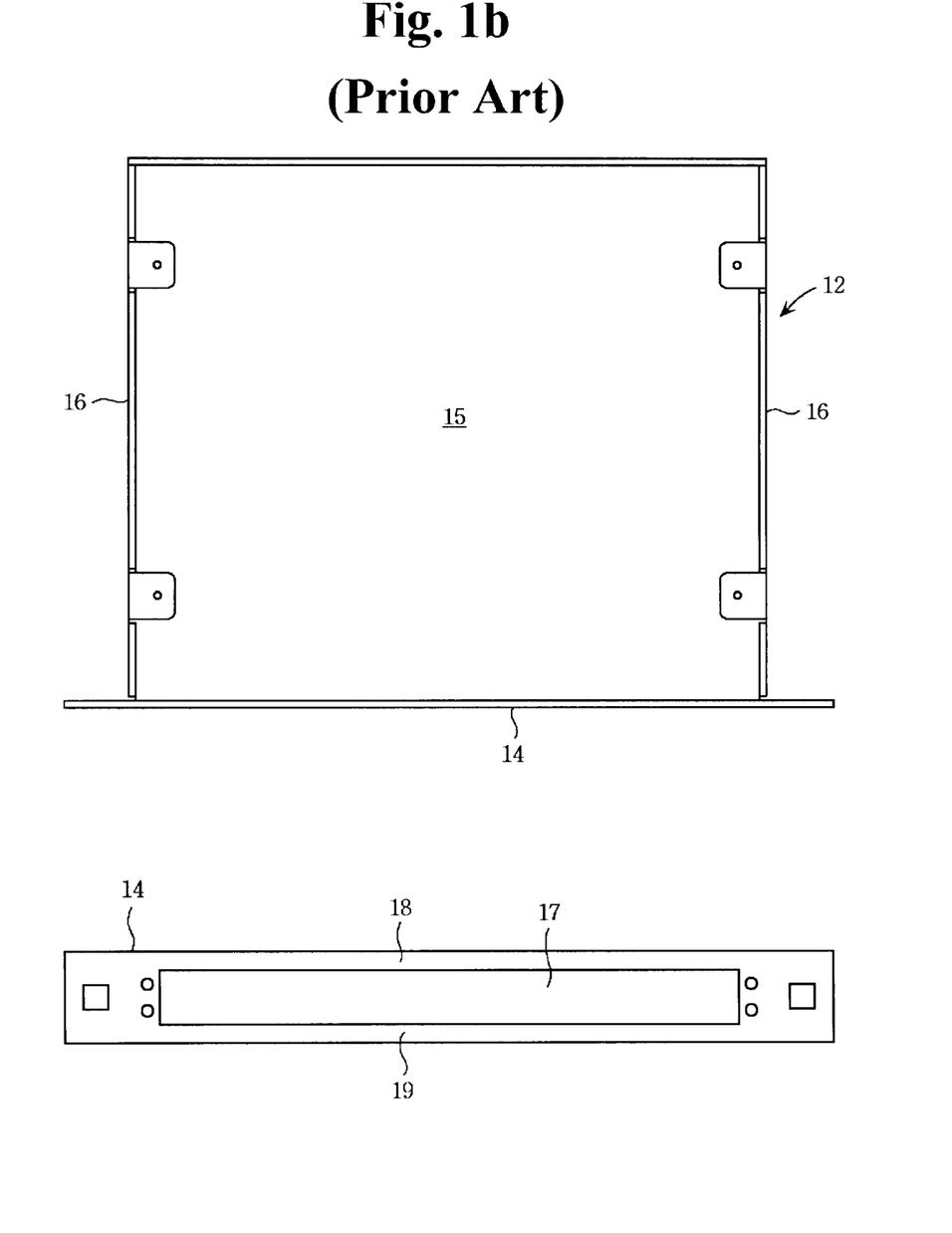
Figure 1C:
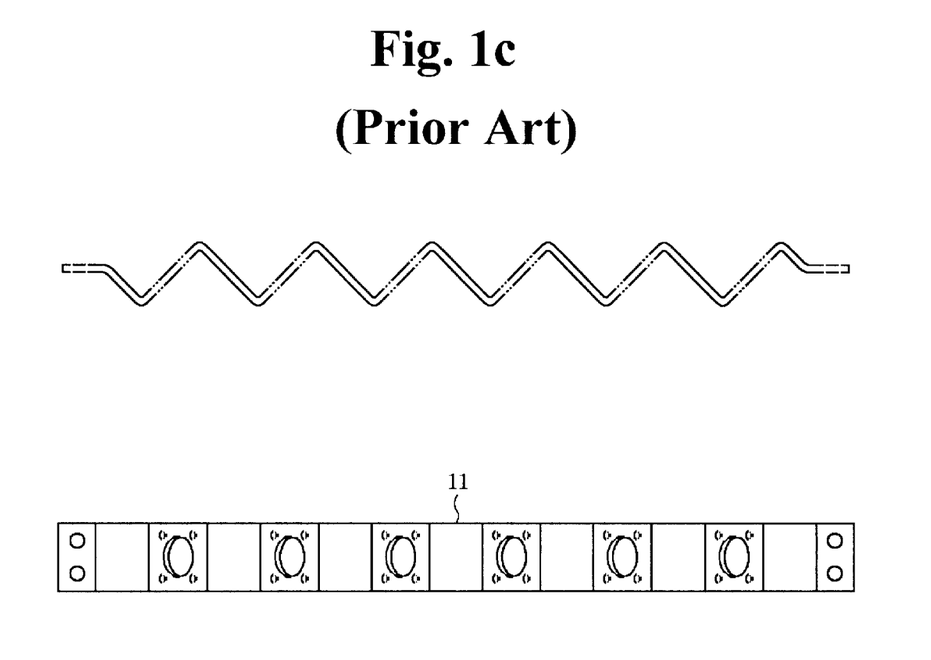

A conventional optical splitter module 10 shown in FIG. 1a has couplers attached with optical connectors and a case containing the couplers. The case comprises an adaptor holder 11 with optical adaptors attached thereto, a housing 12, and a cover 13 mounted on the housing. As shown in FIG. 1b, the housing includes a front portion 14, a bottom portion 15 and sidewalls 16. An upper portion of the housing is shown, opened. The front portion 14 of the housing is formed by upwardly folding a portion extending from the bottom portion of the housing. The front portion 14 of the housing is provided with an opening 17 for mounting an adaptor holder 11 of FIG. 1c with a plurality of optical adaptors attached thereto, and defines a front portion of the module when the adaptor holder is mounted on the module. The adaptor holder 11 has a wrinkled portion with a plurality of alternatively formed peaks and gullies and is inserted into opening 17 of the front portion of the housing. Both ends of the adaptor holder 11 are threaded into the front portion 14 of the housing. The cover 13 is mounted on the opened upper portion of the housing, and thus, the adaptor holder 11 is inserted and mounted between the bottom portion 15 of the housing and the cover 13. A front edge of the bottom portion 15 of the housing 12 and a front edge of the cover 13, which are adjacent to the adaptor holder 11, are manufactured to be in a straight line. According to the conventional optical splitter module, the front portion 14 of the housing is formed by upwardly folding a portion of the bottom portion 15 of the housing. Thus, the front portion 14 of the housing need to have an upper portion 18 and a lower portion 19, each generally having a height of more than 5 mm and extending transversely along the opening into which an adaptor holder, generally having a height of 15 mm, is inserted to support the adaptor holder. This increases the height of the front portion 14 of the housing generally up to about 27 mm, which results in problems such as increase in the overall height of the module 10. This, in turn, limits the number of modules that can be mounted within a chassis.

Figure 2:
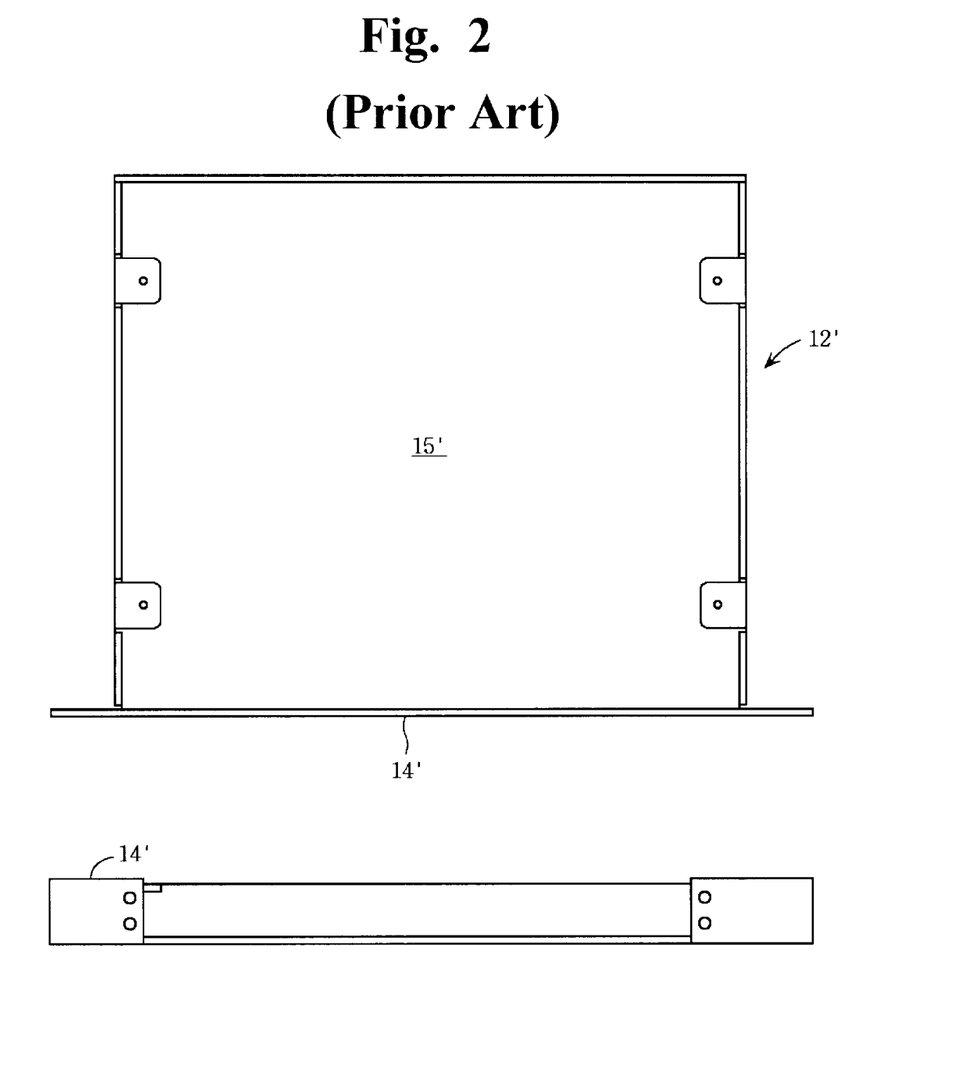
FIG. 2, which is similar to FIG. 1b, is a plan view and an elevational view of a housing of another conventional optical splitter module.

FIG. 2 shows a housing 12' of another conventional optical splitter module. The housing 12' does not require upper and lower portions 18 and 19, as shown in FIG. 1b, extending transversely along an opening of front portion 14' of the housing. Thus, the height of the front portion 14' of the housing 12' can be somewhat reduced. However, as shown in the illustrated conventional module of FIG. 2, an adaptor holder is inserted and mounted between a bottom portion 15' of the housing and cover. Therefore, the height of the front portion of the housing is defined by adding the thickness of the bottom portion 15' of the housing and the thickness of the cover, which are generally about 2 mm, to the height of the adaptor holder, which is generally about 15 mm. Therefore, it is impractical to manufacture the module with a lower height without downsizing the optical adaptor per se.

The adaptor holders in conventional optical splitter modules have the additional problem of being unable to securely and tightly hold the optical adaptor, because the adaptor holder is supported by only threading on both ends of the front portions 14 and 14' of the housings 12 and 12', and the middle portions of the adaptor holder are not fixed.

The present invention is intended to solve the problems of conventional optical splitter modules as described above.

SUMMARY OF THE INVENTION

The object of the present invention is to provide an optical splitter module capable of improving the inserting capabilities of modules within a standard chassis by reducing the height of the optical splitter module.

Another object of the present invention is to provide an optical splitter module capable of tightly securing an adaptor holder by engaging the middle portion of the adaptor holder with the housing and a cover when the adaptor holder is mounted to the housing and the cover of the optical splitter module.

One aspect of the present invention is an optical splitter module including couplers to which one or more optical connectors are attached. The optical splitter module comprises an adaptor holder for fixing a plurality of optical adaptors in a line, the adaptor holder having a height the same as or smaller than the height of the optical adaptors; a housing having a means for fixing the couplers; and a cover adapted for preventing the coupler from being externally exposed. The adaptor holder, the housing and the cover are mechanically fixed to or engaged with one another, and the height of the optical splitter module is smaller than the sum of the thickness of said housing, the thickness of said cover and the height of said optical adapters.

Another aspect of the present invention is an optical splitter module including couplers to which one or more optical connectors are attached. The optical splitter module comprises an adaptor holder for fixing a plurality of optical adaptors in a line, the adaptor holder has a height the same as or smaller than that of the optical adaptor, the adaptor holder comprises a wrinkled portion with a plurality of periodically formed peaks and gullies in a longitudinal direction, the wrinkled portion having a plurality of adaptor insertion holes formed therein for receiving and supporting a plurality of optical adaptors; a housing having a means for fixing the couplers, the housing comprising a bottom portion, sidewalls extending upwardly from one or more edges of the bottom portion, and fixing portions for fixing the adaptor holder thereto, the front edge of the housing having a toothed portion formed therewith, the toothed portion corresponding to the peaks and gullies of the wrinkled portion of the adaptor holder; and a cover adapted for preventing the coupler from being externally exposed, the cover being mounted on the sidewalls of the housing, the front edge of the cover having a toothed portion formed therein, and the toothed portion corresponding to the peaks and gullies of the wrinkled portion of the adaptor holder.

A further aspect of the present invention is to provide an optical splitter module, wherein one or more holes are formed on the wrinkled portion of the adaptor holder, and wherein on the front edge of the housing or on the front edge of the cover, tabs with threaded holes are formed on positions corresponding to the positions of the holes of the adaptor holder.

Yet another aspect of the present invention is to provide an optical splitter module wherein each peak and gully of the toothed portions of the housing and the cover are engaged with the wrinkled portion of the adaptor holder, and has a projection portion adapted to be extended by the thickness of the adaptor holder so that the adaptor holder is mounted on the toothed portions of the housing and the cover.

In the preferred embodiments as summarized above, the angles between the peaks and gullies of the wrinkled portions of the adaptor holder and angles between each adjacent teeth in the toothed portions of the housing and the cover are in the range of 80° to 100°. The lengths of the two sides forming each of the peaks and gullies are substantially identical, and the preferred optical splitter module is provided with handle portions on the front portions thereof.

Other objects, features and advantages of the present invention will be apparent from the following detailed description and the accompanying drawings.

BRIEF DESCRIPTION OF THE DRAWINGS

The present invention is substantially illustrated below and are set forth with particularity in the appended claims.

FIG. 1b shows a plan view and an elevational view of the housing of the conventional optical splitter module shown in FIG. 1a.

FIG. 1c is a plan view and an elevational view of the adaptor holder of the conventional optical splitter module shown in FIG. 1a.

DETAILED DESCRIPTIONS OF THE PREFERRED EMBODIMENTS

An optical splitter module of the first embodiment according to the present invention will now be described in conjunction with the accompanying drawings.

Figure 3:
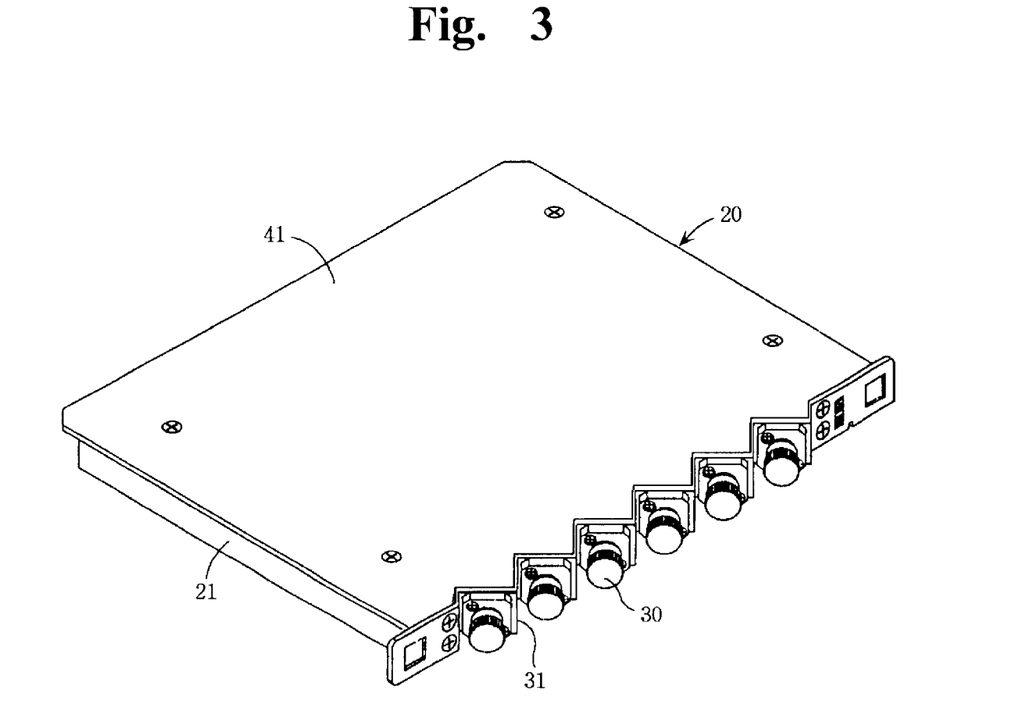
FIG. 3 is a perspective view of the optical splitter module according to the present invention.

With reference to FIG. 3, the optical splitter module 20 of the present invention comprises a plurality of couplers with one or more optical connectors attached thereto and a case containing the couplers. The case of the module comprises an adaptor holder 31 holding a plurality of optical adaptors 30, a housing 21, and a cover 41.

Figure 4:
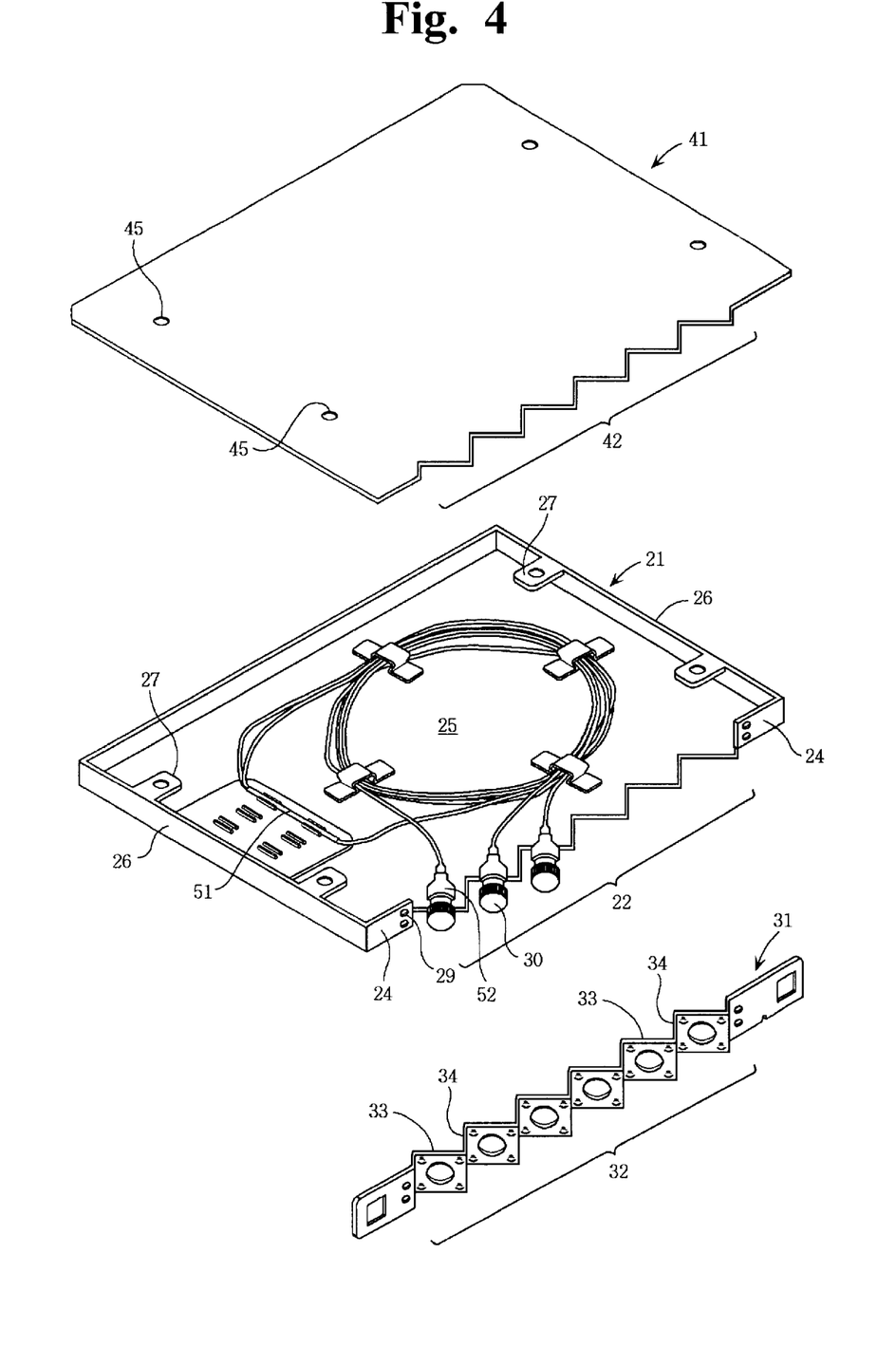
FIG. 4 is an exploded perspective view of the optical splitter module shown in FIG. 3.

Referring to FIG. 4, the housing 21 of the present invention comprises a bottom portion 25 and sidewalls 26. The upper portion of the housing is shown opened. A fixing portion 24 for fixing the adaptor holder thereto is integrally formed on a front portion of the housing. The housing contains a plurality of couplers 51 with optical connectors 52 attached thereto. The cover 41 is mounted on sidewalls 26 of the housing. The front edge of a bottom portion 25 of housing 21 and the front edge of the cover 41, which are engaged with the adaptor holder 31, have toothed portions 22 and 42 formed therein. The toothed portions correspond to peaks and gullies of a wrinkled portion 32 of the adaptor holder 31, respectively.

Figure 5:
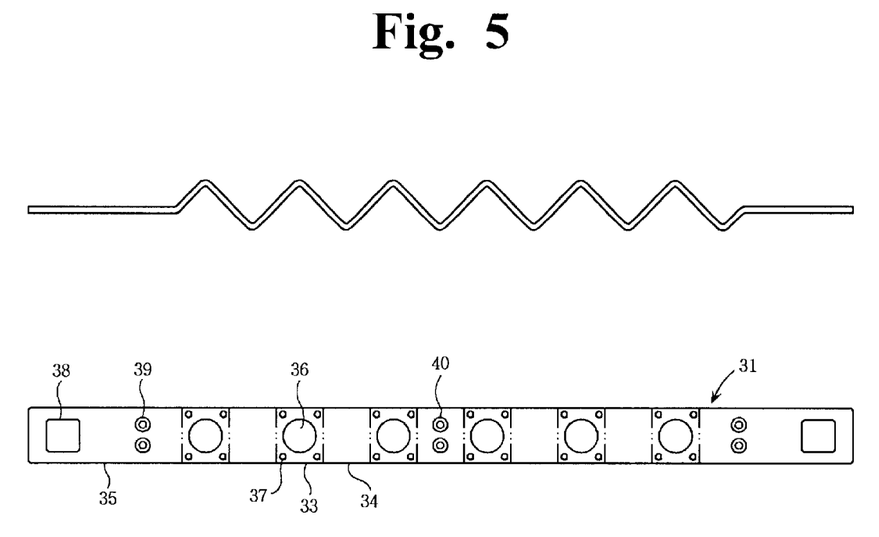
FIG. 5 is a plan view and an elevational view of the adaptor holder of the optical splitter module shown in FIG. 3.

With reference to FIGS. 4 and 5, the adaptor holder 31 of the present invention comprises the wrinkled portion 32, which has a predetermined height and a plurality of peaks and gullies periodically formed in a longitudinal direction. A plurality of optical adaptors are inserted and mounted into the adaptor holder. It is preferable that the height of the adaptor holder is the same as or smaller than that of the optical adaptor. Preferably, a plurality of optical adaptors are threaded into the adaptor holder. For this purpose, adaptor insertion holes 36 for fixing and supporting the optical adaptors and threaded holes 37 for fixing the optical adaptor to the adaptor holder are provided on the portion 33 of the adaptor holder where the respective optical adaptors 30 are mounted. Both ends of the adaptor holder are provided with handle portions 35 having mounting apertures 38 and holes 39, which are used when mounting the optical splitter module within a chassis. The holes 39 of the handle portions correspond to threaded holes 29 of the fixing portions 24 of the housing, whereby the adaptor holder 31 is fixed to the fixing portions 24 of the front of the housing by threaded engagement through the holes 29 and 39. A locking member (not shown) is provided to the mounting apertures 38 in order to lock the module 20 within the chassis. Because the conventional module was locked to the chassis by rotating a butterfly nut 90°, both sides of the locking members were in the proceeding direction of the optical cords, and thus, an interference was generated therebetween. However, according to the present embodiment, the module is mounted on the chassis in the manner of a sliding latch by slightly pressing the module into the mounting apertures or brackets of the chassis. The locking member is smaller than that of conventional modules, and thus, it is not interfered to the proceeding direction of the optical cords. In addition, the chassis (not shown) with the module inserted therein is adapted to separately contain modules for inserting into the left side of the chassis and modules for inserting into the right side of the chassis.

Figure 6:
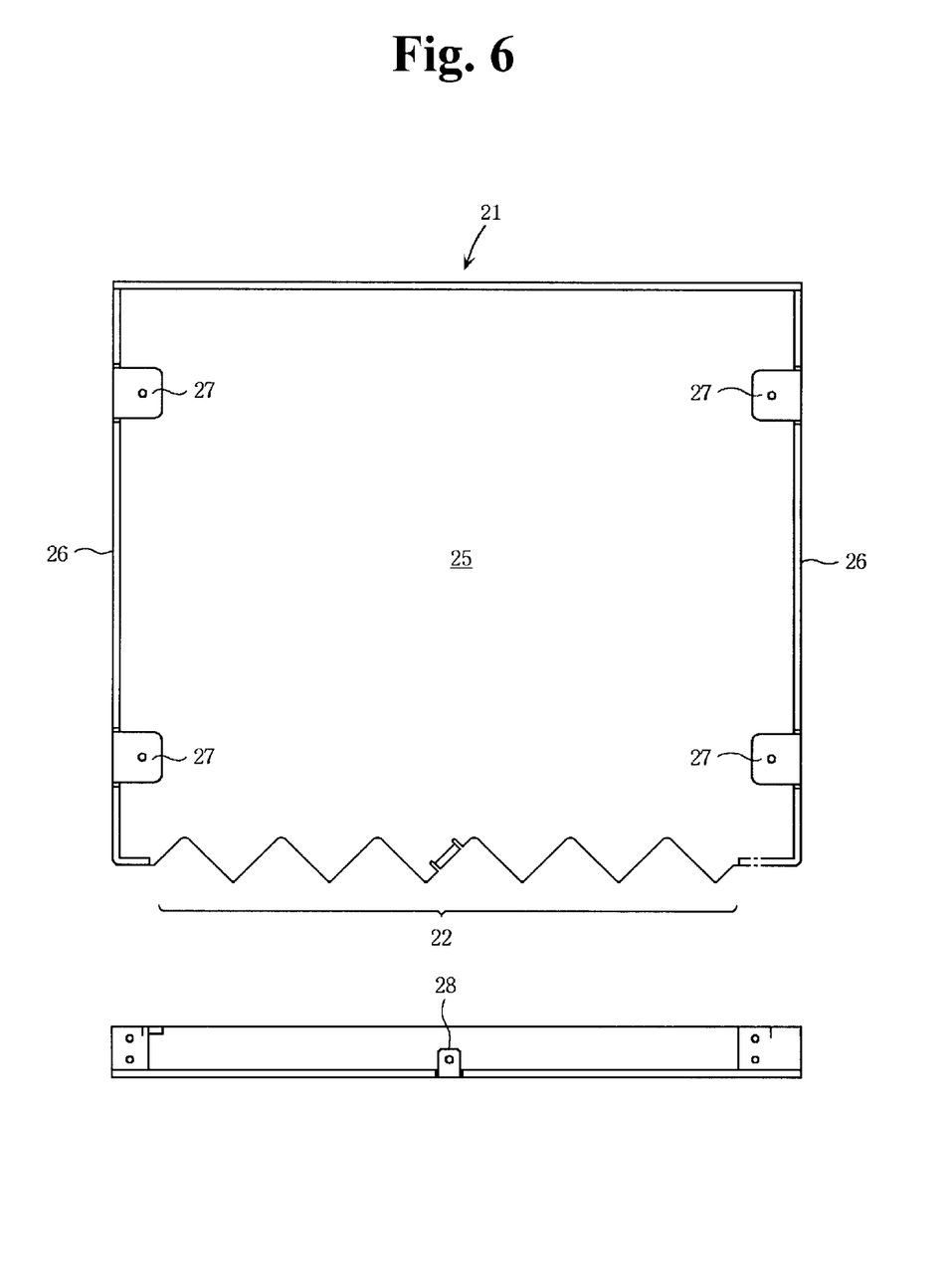
FIG. 6 is a plan view and an elevational view of the housing of the optical splitter module shown in FIG. 3.

With reference to FIGS. 4 and 6, the housing 21 of the present invention is formed with toothed portion 22 on the front edge of the bottom portion 25, which engages the wrinkled portion 32 of the adaptor holder 31. The front portion of the housing 21 is defined by the adaptor holder 31, and therefore, it is not necessary to extend and upwardly fold the bottom portion of the housing in order to define the front portion of the housing. As a result, the portions of the prior art, 18 and 19 of FIG. 1b, extending transversely along the opening of the front portion of the housing, are removed and the height of the housing can be reduced.

On the sidewalls 26 of the housing, a plurality of tabs 27 are extended, each tab having a threaded hole for mounting the cover 41 by threaded engagement. In the toothed portion 22 formed on the bottom portion 25 of the housing, one or more sides 34 corresponding to one or more sides of the wrinkled portion of the adaptor holder 31, on which the optical adaptor 30 is not mounted, are provided with a tab 28 having a threaded hole. The tab 28 assures secure engagement between the adaptor holder and the housing by engaging the tab 28 with a hole 40, FIG. 5 formed on the wrinkled portion 32 of the adaptor holder 31 by a thread. Therefore, the generation of a large gap or a shaking on the middle part of the optical splitter module is prevented.

Figure 7:
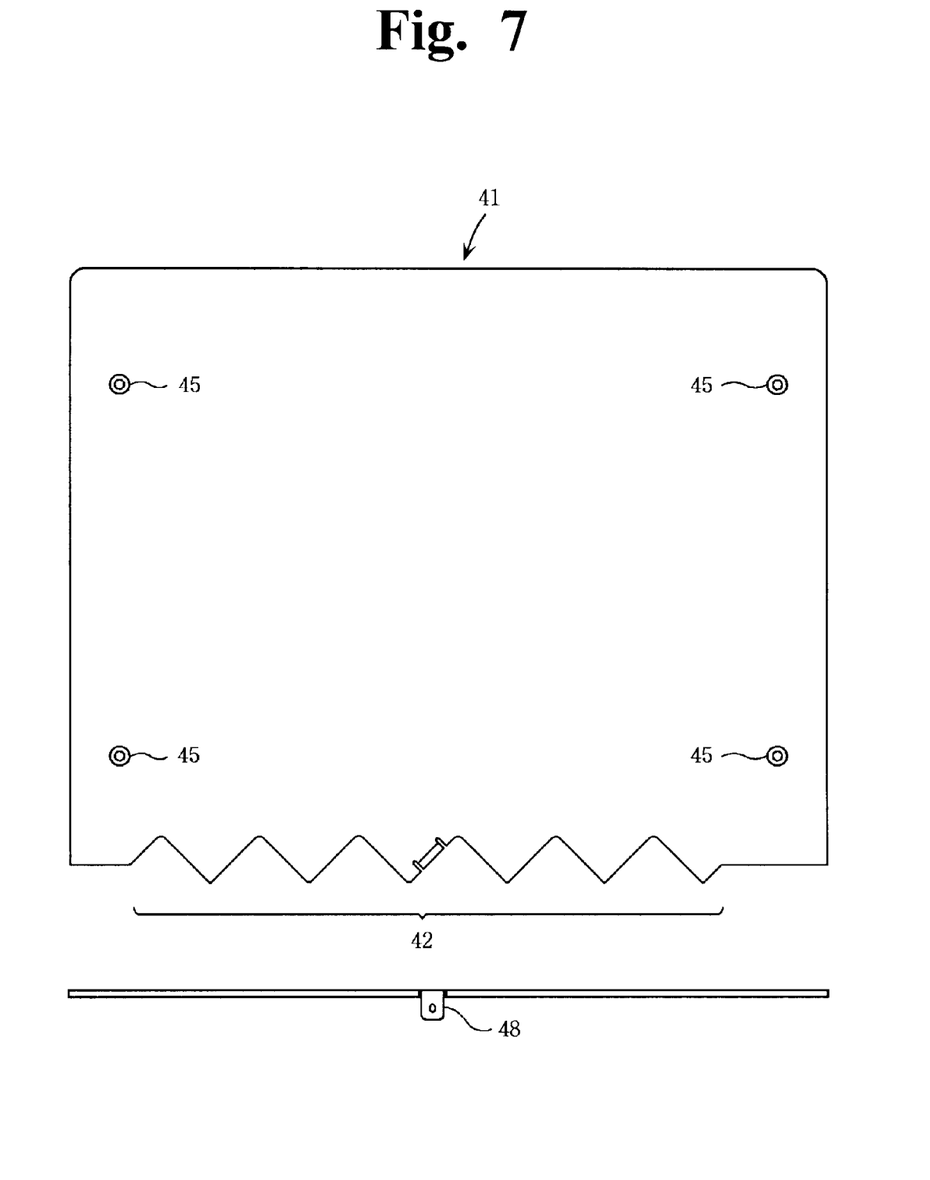
FIG. 7 is a plan view and an elevational view of the cover mounted on the housing of the optical splitter module shown in FIG. 3.

The cover 41 shown in FIG. 7 is mounted on the upper portion of the housing 21, and preferably threaded therebetween. For this purpose, the cover is provided with holes 45 corresponding to the threaded holes of the tabs 27 formed on the sidewalls 26 of the housing 21. The front edge of the cover 41, which is adjacent to the adaptor holder 31 when assembled, comprises a toothed portion 42 corresponding to the peaks and gullies of the wrinkled portion 32 of the adaptor holder 31, in the same manner as the front edge of the bottom portion 25 of the housing 21. In addition, a tab 48 is formed on the cover 41 and is joined to a hole 40 in FIG. 5 of the wrinkled portion 32 of the adaptor holder 31, in the same manner as the tab 28 on the housing 21. Thus, the tab 48 assures that the adaptor holder is firmly secured on the cover. The angles of the peaks and gullies of the wrinkled portion 32 and the angles of the teeth in the toothed portions 22 and 42 are selected so as to provide mounting convenience for the optical adaptor, while reducing the length of the adaptor holder. Preferably, the angles of the peaks and gullies of the wrinkled portion and the angles of the teeth in the toothed portions are in the range of 80° to 100°. In addition, it is preferable that the lengths of the two sides forming each peak and gully are of substantially identical length to provide convenience for mounting to the optical adaptor.

With further reference to FIGS. 3 and 4, the adaptor holder, the housing, and the cover are assembled to form a case for the optical splitter module 20 of the present invention. The adaptor holder 31 defines a front portion of the housing when assembled. As shown in FIGS. 3 and 4, the front edges of the housing 21 and the cover 41 comprise the toothed portions 22 and 42 corresponding to the peaks and gullies of the wrinkled portion 32 of the adaptor holder 31. As such, unlike the prior art, the adaptor holder 31 is not inserted between the bottom portion 25 of the housing and the cover 41, but mounted to the housing by being engaged with the front edge 23 of the housing 21 and the front edge 43 of the cover 41 while covering the frond edges. Therefore, when assembling the module, the adaptor holder, the housing and the cover can be securely engaged, assembled and fixed to one another by the respective wrinkled portions and toothed portions. Accordingly, the height of the front portion of the housing 21 does not exceed the height of the adaptor holder 31, and the overall height of the module 20 is the same as or smaller than the height of the optical adaptor mounted on the adaptor holder. For instance, the height of the conventional module shown in FIG. 1, 27 mm, can be reduced to the height of the adaptor holder, 15 mm.

Figure 8:
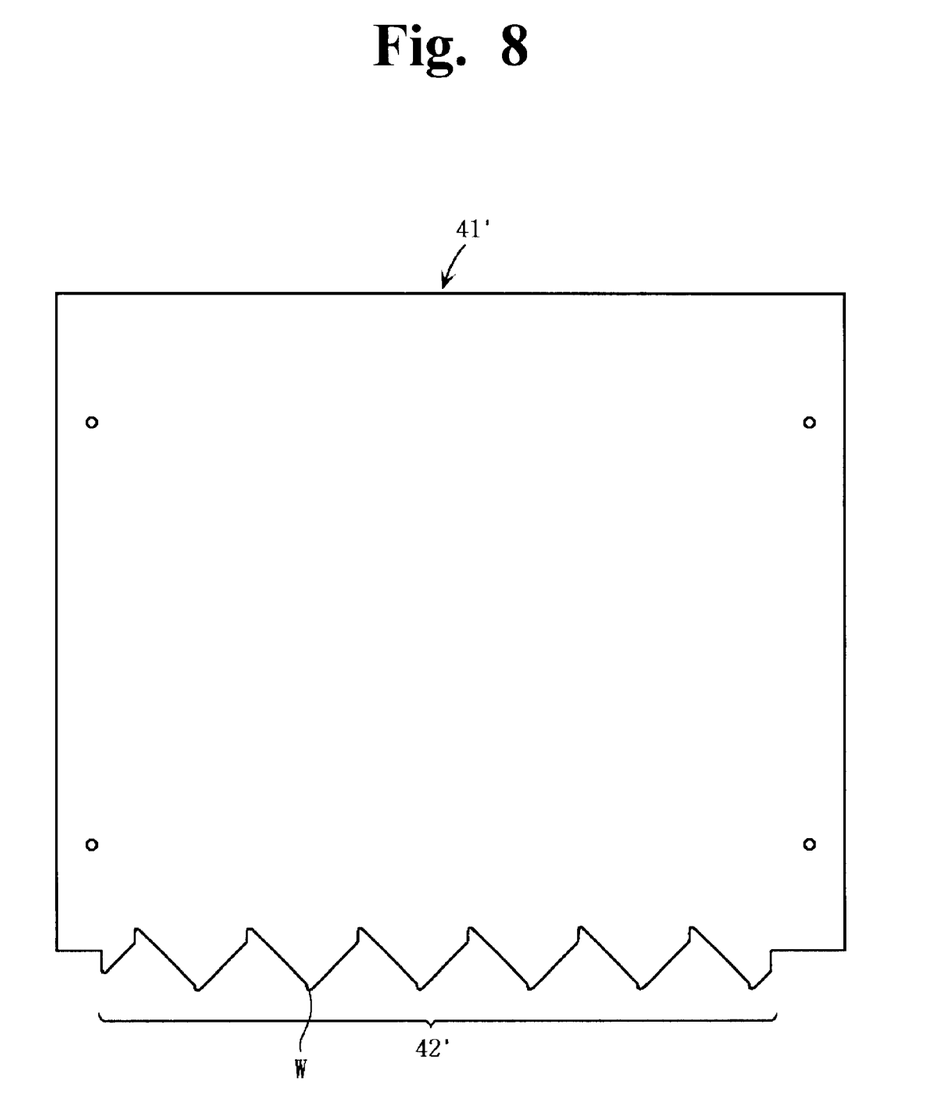
FIG. 8 is a plan view of a housing of the optical splitter module according to a second embodiment of the present invention.
Figure 9:
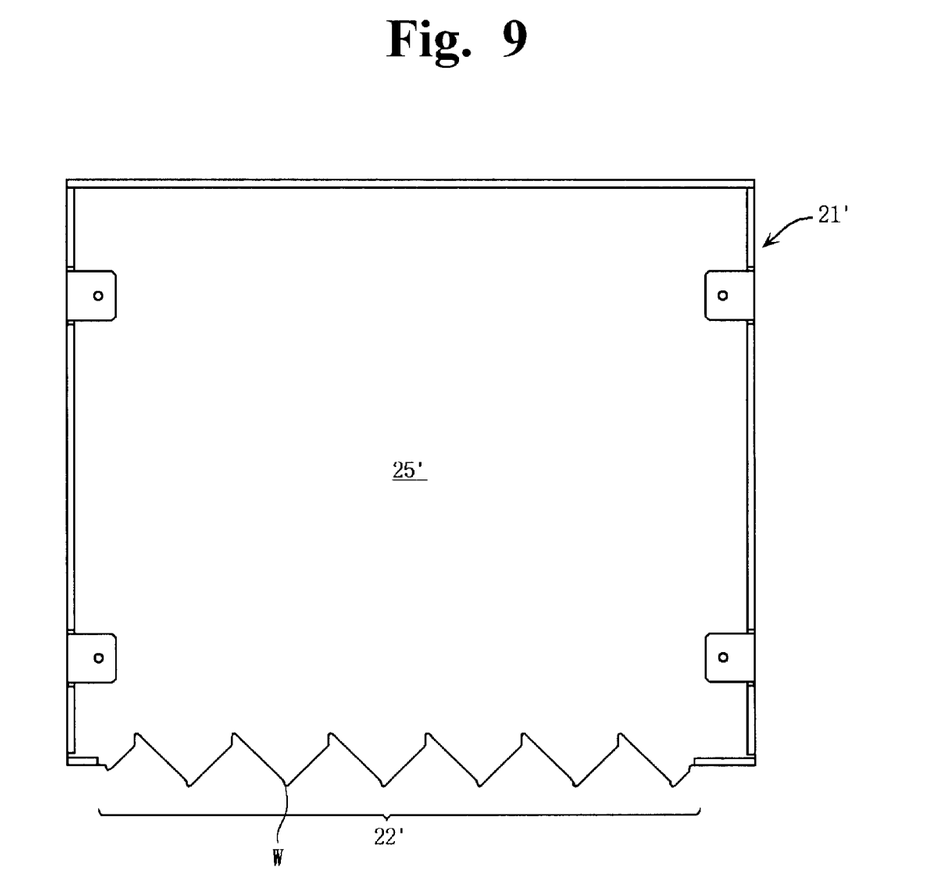
FIG. 9 is a plan view of a cover for the optical splitter module according to the second embodiment of the present invention.
Figure 10:
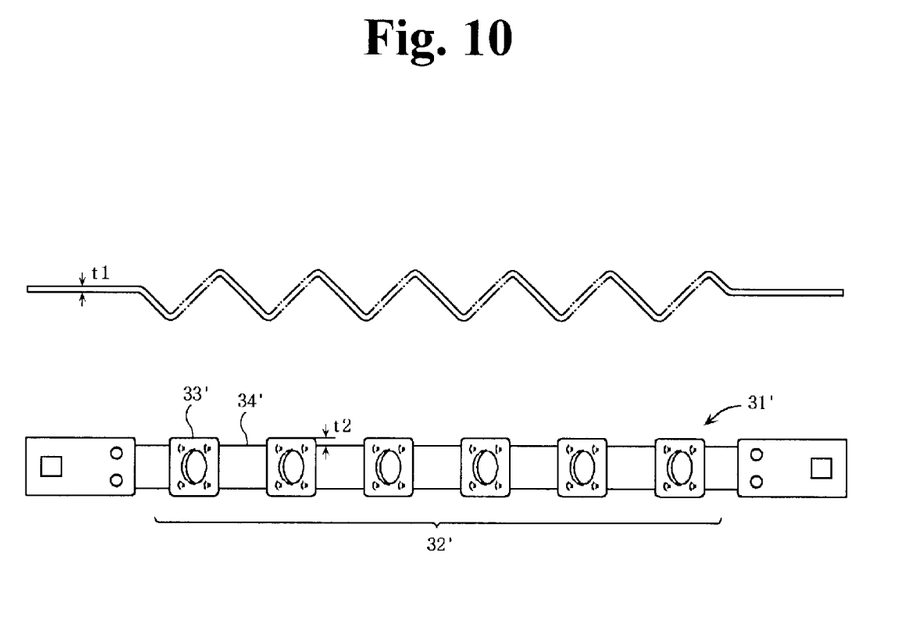
FIG. 10 is a plan view and an elevational view of the adaptor holder of the optical splitter module according to the second embodiment of the present invention.

The second embodiment according to the present invention will be described with reference to FIGS. 8, 9 and 10. As with the first embodiment, the front edge of a bottom portion 25' of a housing 21' and a front edge of a cover 41' comprise toothed portions 22' and 42' corresponding to peaks and gullies of a wrinkled portion 32' of an adaptor holder 31'. The toothed portions 22' and 42' formed on the front edges of the housing 21' and the cover 41' has a projection portion to be extended to a width W, equal to the thickness t1 of the adaptor holder 31' in order to cover the thickness of the adaptor holder. In the peaks and gullies of the wrinkled portion 32' of the adaptor holder 31', the heights of portions 34' on which optical adaptors are not mounted are reduced by a thickness t2 that is the same as the width W of the projection portion. Accordingly, when the wrinkled portion 32' of the adaptor holder 31' is engaged with the toothed portions of the housing 21' and the cover 41', the adaptor holder 31' can be inserted between the toothed portions of the housing 21' and the cover 41'. As such, the adaptor holder 31' can be securely assembled and avoid displacement.

The optical splitter module according the present invention is manufactured in a small size wherein the height of the module is reduced to the level of the height of the adaptor holder itself, and a secure engagement between the adaptor holder and the housing is guaranteed. For instance, when the height of the conventional module, 27 mm, is reduced to the height of the adaptor holder, 15 mm, the stacking efficiency increases to 80% or more when stacking the module within the same chassis. Therefore, the costs for installing an additional chassis can be reduced and overall installment space can be saved with a new subscriber.

Various modifications and adaptations to the present invention will become apparent to one skilled in the art after having the benefit of this disclosure. All such modifications and adaptations are considered within the scope and spirit of the present invention as defined by the following claims.

What is claimed is:

1. An optical splitter module having couplers to which one or more optical connectors are attached, said optical splitter module comprising:

an adaptor holder for fixing a plurality of optical adaptors in a line, said adaptor holder having a height the same as or smaller than those of said optical adaptors;

a housing having a means for fixing said couplers; and a cover adapted for preventing said couplers from being externally exposed;

wherein said adaptor holder, said housing and said cover are mechanically fixed to or engaged to one another, and the height of said optical splitter module is smaller than the sum of the thickness of said housing, the thickness of said cover and the height of said optical adapters.

2. The optical splitter module of claim 1, wherein said adaptor holder comprises a wrinkled portion with a plurality of peaks and gullies alternatively formed in a longitudinal direction, said wrinkled portion having a plurality of adaptor insertion holes formed therein for receiving and supporting a plurality of said optical adaptors;

wherein said housing comprises a bottom portion, sidewalls extending upwardly from one or more edges of said bottom portion, and fixing portions for fixing said adaptor holder thereto, a front edge of said housing having a toothed portion formed thereon, said toothed portion corresponding to said peaks and gullies of said wrinkled portion of said adaptor holder; and wherein said wrinkled portion of said adaptor holder is engaged with said toothed portion of said front edge of said housing.

3. The optical splitter module of claim 2, wherein angles between said peaks and gullies of said wrinkled portion and angles between each adjacent teeth in said toothed portions are in the range of 80° to 100°, the lengths of each of the two sides forming each said peaks and gullies are substantially identical, and said optical splitter module is provided with handle portions on the front portions thereof.

4. The optical splitter module of claim 1, wherein said adaptor holder comprises a wrinkled portion with a plurality of peaks and gullies alternatively formed in a longitudinal direction, said wrinkled portion having a plurality of adaptor insertion holes formed therein for receiving and supporting a plurality of said optical adaptors;

wherein said cover is mounted on sidewalls of said housing, a front edge of said cover having a toothed portion formed thereon, said toothed portion corresponding to said peaks and gullies of said wrinkled portion of said adaptor holder; and wherein said wrinkled portion of said adaptor holder is engaged with said toothed portion of said front edge of said cover.

5. The optical splitter module of claim 4, wherein angles between said peaks and gullies of said wrinkled portion and angles between each adjacent teeth in said toothed portions are in the range of 80° to 100°, lengths of each of the two sides forming each said peaks and gullies are substantially identical, and said optical splitter module is provided with handle portions on the front portion thereof.

6. An optical splitter module having couplers to which one or more optical connectors are attached, said optical splitter module comprising:

an adaptor holder for fixing a plurality of optical adaptors in a line, said adaptor holder having a height the same as or smaller than those of said optical adaptors, said adaptor holder comprising a wrinkled portion with a plurality of peaks and gullies alternatively formed in a longitudinal direction, said wrinkled portion having a plurality of adaptor insertion holes formed therein for receiving and supporting a plurality of said optical adaptors;

a housing having a means for fixing said couplers, said housing comprising a bottom portion, sidewalls extending upwardly from one or more edges of said bottom portion, and fixing portions for fixing said adaptor holder thereto, a front edge of said housing having a toothed portion formed therewith, said toothed portion corresponding to said peaks and gullies of said wrinkled portion of said adaptor holder; and a cover adapted for preventing said coupler from being externally exposed, said cover being mounted on said sidewalls of said housing, a front edge of said cover having a toothed portion formed therein, said toothed portion corresponding to said peaks and gullies of said wrinkled portion of said adaptor holder;

wherein said adaptor holder, said housing and said cover are mechanically fixed to or engaged with one another, and the height of said optical splitter module is smaller than the sum of the thickness of said housing, the thickness of said cover and the height of said optical adaptors.

7. The optical splitter module of claim 6, wherein one or more holes are formed on said wrinkled portion of said adaptor holder, and wherein on said front edge of said housing or said front edge of said cover, tabs with threaded holes are formed on positions corresponding to the positions of said holes of said adaptor holder.

8. The optical splitter module of claim 7, wherein angles between said peaks and gullies of said wrinkled portion and angles between each adjacent teeth in said toothed portions are in the range of 80° to 100°, the lengths of each of the two sides forming each said peaks and gullies are substantially identical, and said optical splitter module is provided with handle portions on the front portion thereof.

9. The optical splitter module of claim 6, wherein each peak and gully of said toothed portions of said housing and said cover is engaged with said wrinkled portion of said adaptor holder and has projection portions adapted for extension by a thickness of said adaptor holder such that said adaptor holder is mounted on said projection portions of said toothed portions of said housing and said cover.

10. The optical splitter module of claim 9, wherein angles between said peaks and gullies of said wrinkled portion and angles between each adjacent teeth in said toothed portions are in the range of 80° to 100°, the lengths of each of the two sides forming each said peaks and gullies are substantially identical, and said optical splitter module is provided with handle portions on the front portion thereof.

11. The optical splitter module of claim 6, wherein angles between said peaks and gullies of said wrinkled portion and angles between each adjacent teeth in said toothed portions are in the range of 80° to 100°, the lengths of each of the two sides forming each said peaks and gullies are substantially identical, and said optical splitter module is provided with handle portions on the front portion thereof.

* * * * *

UNITED STATES PATENT AND TRADEMARK OFFICE
CERTIFICATE OF CORRECTION

PATENT NO. : 6,678,457 B1
DATED : January 13, 2004
INVENTOR(S) : Seong Gwon Kim et al.

It is certified that error appears in the above-identified patent and that said Letters Patent is hereby corrected as shown below:

<u>Title page,</u>
Item [73], Assignee, "Unicom Technologies, Co., LTD, Gwangju (KR)" should read
-- Unicom Technologies, Co., LTD., Gwangju (KR) --

Signed and Sealed this

Eleventh Day of May, 2004

JON W. DUDAS
*Acting Director of the United States Patent and Trademark Office*